No. 750,832. PATENTED FEB. 2, 1904.
A. A. DUNHAM.
PROCESS OF PREPARING FOOD CASEIN.
APPLICATION FILED JULY 8, 1902.
NO MODEL.
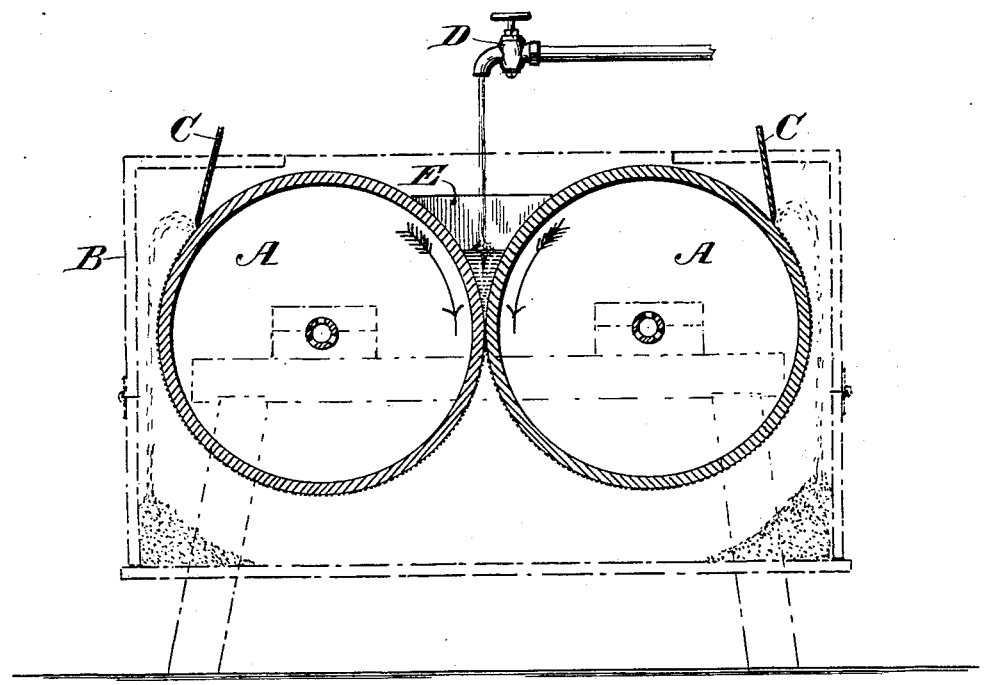
Witnesses:
Robert Everett,
Arthur W. Calvert.
Inventor:
Andrew A. Dunham,
by Henry Calvert, Atty.

No. 750,832. Patented February 2, 1904.

UNITED STATES PATENT OFFICE.

ANDREW A. DUNHAM, OF NEW YORK, N. Y., ASSIGNOR TO THE CASEIN COMPANY OF AMERICA, A CORPORATION OF NEW JERSEY.

PROCESS OF PREPARING FOOD CASEIN.

SPECIFICATION forming part of Letters Patent No. 750,832, dated February 2, 1904.

Application filed July 8, 1902. Serial No. 114,704. (No specimens.)

*To all whom it may concern:*

Be it known that I, ANDREW A. DUNHAM, a citizen of the United States, residing at New York, in the county of New York and State of New York, have invented certain new and useful Improvements in Processes of Preparing Food Casein, of which the following is a specification, reference being had therein to the accompanying drawings.

The indigestibility of casein is now universally recognized as the chief obstacle to its employment as a food for infants. Modern investigation of the comparative properties of casein from cows and human milk discloses the fact that casein from cow's milk forms firm masses of curd in the stomach, while that from mother's milk is coagulated in the form of minute, soft, flocculent particles. It is evident that if the casein becomes acid it coagulates, as a healthy stomach always contains free acid and the precipitated casein stubbornly resists the digestive action of the infantile stomach. Casein from human milk, on the other hand, only partially coagulates, and the coagulum, as aforesaid, is extremely light and flocculent, hence the ready digestibility of casein from human milk. Many attempts have been made to modify the casein from cow's milk and give it the properties possessed by that from human milk; but to my knowledge never before has a casein powder been produced that possessed these properties. Casein solutions have been prepared which form upon treatment with acids light and flocculent curds; but upon drying out these casein solutions their character was so changed that they no longer had the desired properties and were rendered more or less insoluble by the process employed for drying.

This invention or discovery has for its object the production of casein powder which is very easily digestible, so that it is well adapted as a food product for use in the preparation of foods for invalids and infants and of such a character that when precipitated with acid a very light and flocculent as well as an easily-digested curd will result. In other words, the invention or discovery has for its object to produce a casein which possesses all the properties of casein from mother's milk.

In carrying the invention or discovery into effect the casein is first precipitated from the milk, preferably by the use of hydrochloric acid, and the resulting curd is then thoroughly washed to free it from the acid and milk-sugar. The curd thus treated is then dissolved with any suitable alkali, preferably bicarbonate of soda. If a product of absolute purity is desired, the casein solution is then reprecipitated, preferably with hydrochloric acid, and is then again dissolved, preferably with bicarbonate of soda. In either manner of practicing the process the bicarbonate casein solution is then treated with pancreatin or any other suitable digestive ferment in the proportion of about one per cent. of the digestive ferment to the casein in the solution. The digestive action is allowed to continue for about twenty minutes to half an hour or until a sample when treated with an acid forms a light, soft, and flocculent curd, the solution being kept during the digestive process at a temperature of about 110° Fahrenheit to hasten the digestive action. The digestive action of the pancreatin on the casein is then arrested by heating the solution to the boiling-point or above, and this stops the action of the pancreatin. This heating of the mixture may be effected by boiling the entire mass, or it may be effected through the drying process which is to follow. This drying process consists in subjecting a thin film of the solution to the action of a steam-heated cylinder or cylinders, into contact with the surface of which the solution may be brought in any suitable manner. Preferably two contiguous rotating steam-heated cylinders, to which a stream of the solution can be run from a faucet or in any suitable manner, are employed. Said cylinders run in contact, so that they will retain between them a quantity of the solution, which is carried around in a thin film as the cylinders revolve and is dried before each cylinder has completed a revolution, such dried film being removed from the surface of the cylinders by stationary scrapers in contact therewith. The dried casein film thus removed by the scrapers is in the form of a very fine powder, which is so light that it is necessary to inclose the apparatus in a box to prevent waste of the casein powder by flying off in the air.

The accompanying drawing illustrates in vertical section a form of apparatus suitable for effecting the drying of the casein solution.

In the drawing, A A denote two contiguous steam-heated cylinders, which are mounted in any suitable manner, so as to rotate in contact with each other, said cylinders being preferably inclosed within a box or casing B, (denoted by dotted lines,) in which are mounted suitable scrapers C for removing the dried film of casein from the cylinders. The partly-digested casein solution is fed to the cylinders in any suitable manner, as by being conducted from a spout or faucet D, from which the liquid runs with sufficient rapidity, so that a quantity thereof will accumulate in the recess between the upper portions of the cylinders, the ends of the trough formed by the contiguous cylinders being closed in any suitable manner, as by pieces E, of wood or other material, resting against the cylinders near their ends and shaped to fit the trough between the cylinders.

If the digestive action of the pancreatin on the casein solution be arrested by boiling the entire mass before it is dried, the drying process to produce the casein powder can follow at any suitable or convenient time subsequent to the boiling process; but if the heating of the casein by the drying-cylinders is to be relied upon for arresting the digestive action of the pancreatin it is obvious that the solution must be quickly subjected to the heating and drying process when the digestive action has continued for the proper length of time. I prefer to arrest the digestive action by means of the latter process.

Instead of precipitating the casein from the milk by hydrochloric acid, as hereinbefore stated, any suitable commercial alkaline casein may be employed; but the precipitation of the casein by hydrochloric acid is preferred, as is also the solution of the casein with bicarbonate of soda. Also the reprecipitating step of the process is preferred where an article of absolute purity is desired, although this reprecipitation is not absolutely essential.

The casein powder produced in the manner hereinbefore described is well adapted as a food product for invalids and infants, in that having been already partly digested by the pancreatin it is very easily digested when used as an article of food. The casein powder produced in the manner described is what may properly be termed "pure" casein, being almost chemically pure, and is readily and completely soluble in cold or hot water, so that in being mixed with other substances in food products it can be thoroughly incorporated therewith, as will be understood.

Having thus described my invention or discovery, I claim and desire to secure by Letters Patent—

The herein-described process for producing an easily-digestible casein, consisting in dissolving the casein with a suitable solvent, then treating the casein solution with a digestive agent, arresting the action of the digestive agent, before digestion is completed, by subjecting the solution, in a thin film, on the surface of a cylinder heated to a temperature of not less than 212° Fahrenheit, such subjection of the casein solution to heat continuing until the liquid of the solution is dried out and a film of dried casein is formed, and finally removing such dried casein film from the cylinder and disintegrating the same to form a fluffy comminuted product.

In testimony whereof I affix my signature in presence of two witnesses.

ANDREW A. DUNHAM.

Witnesses:
F. J. WALSH,
F. A. WEBSTER.